May 5, 1970     R. A. C. CALDER     3,509,699
HARVESTER PLATFORM FOR WINDROWERS
Filed Oct. 23, 1967     2 Sheets-Sheet 1
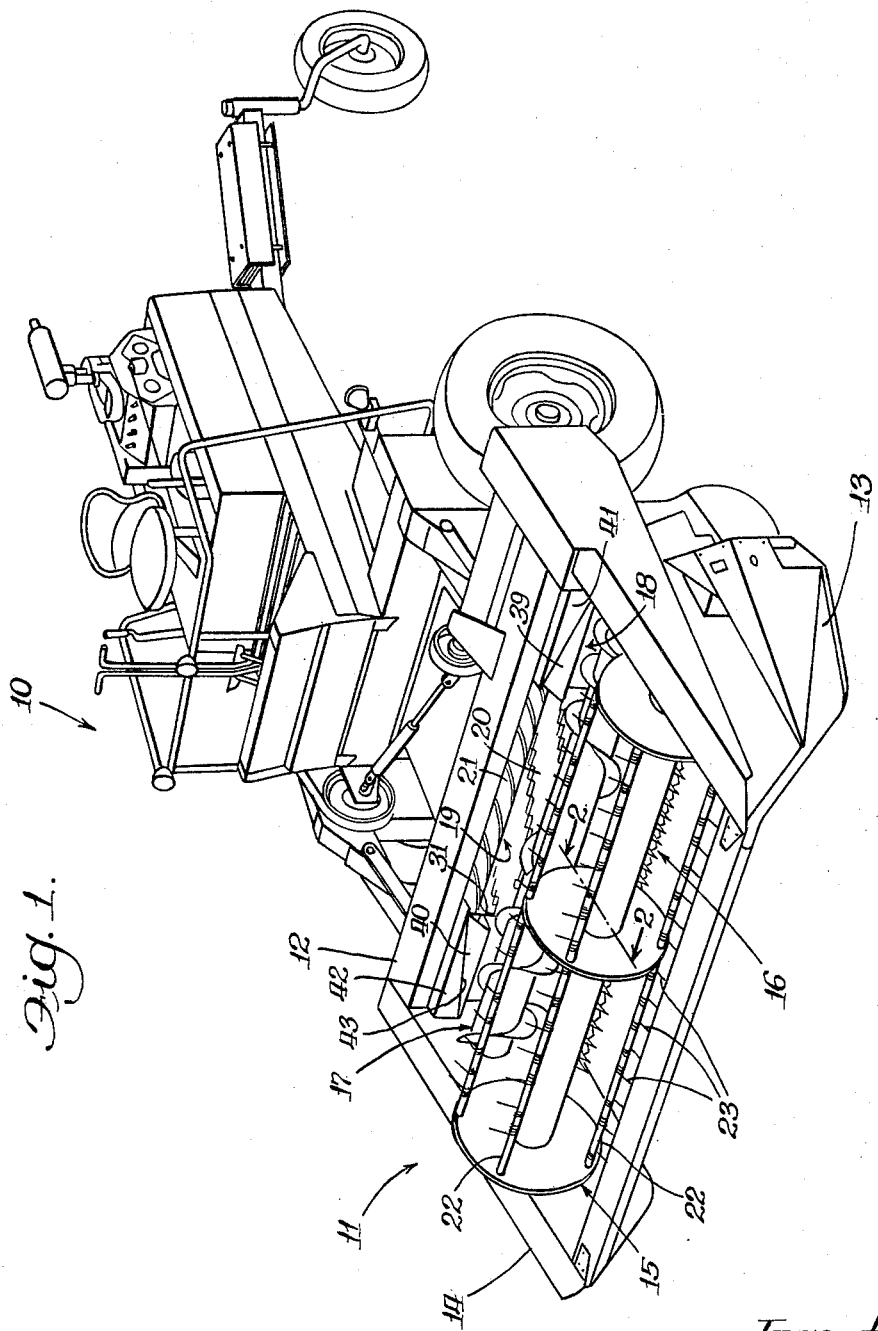
Inventor:
Robert A. C. Calder
By: Neal C. Johnson
Atty.

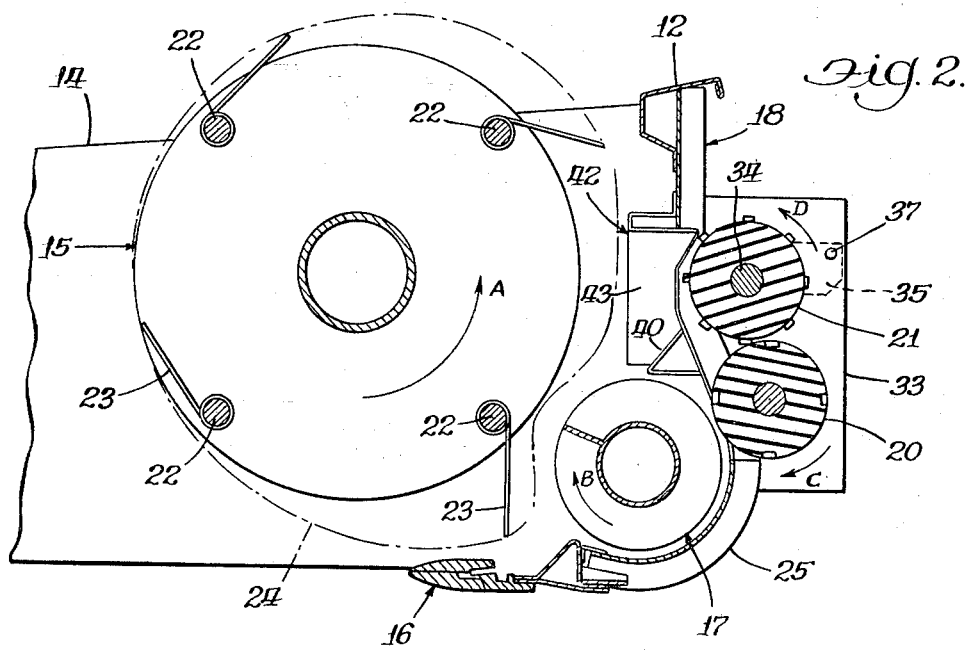
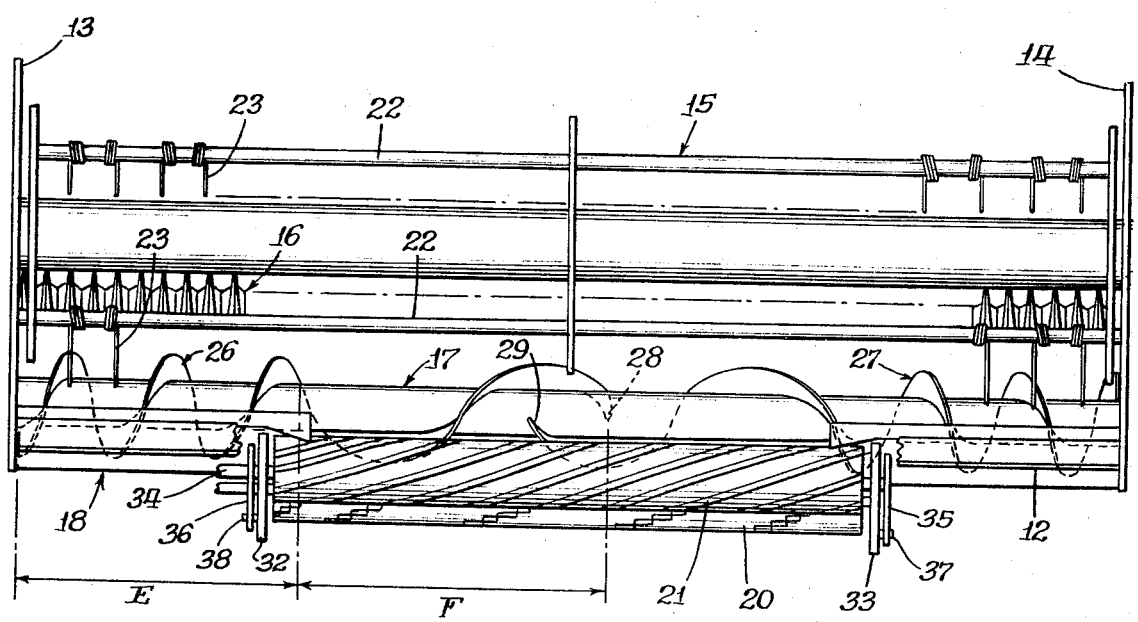

3,509,699
HARVESTER PLATFORM FOR WINDROWERS
Robert A. C. Calder, Hamilton, Ontario, Canada, assignor to International Harvester Company, Chicago, Ill., a corporation of Delaware
Filed Oct. 23, 1967, Ser. No. 677,100
Int. Cl. A01d 43/10
U.S. Cl. 56—23    9 Claims

ABSTRACT OF THE DISCLOSURE

A harvester platform including a cutter and a reel for cutting a crop and moving the same rearwardly onto an auger mounted lengthwise of the platform. The auger spans a crop discharge opening defined through the platform and includes flights of variable pitch for supporting and moving the cut crop toward the discharge opening. A pair of crushing rollers are rotatably mounted on the platform rearwardly of the discharge opening in close proximity to the auger for stripping the crop from the auger in conjunction with crushing the crop for deposit on the ground in a windrow.

BACKGROUND OF THE INVENTION

Field of the invention

The invention relates generally to harvesters and more particularly to a harvester platform for windrowers designed to cut and convey a crop into a windrow.

Description of the prior art

The harvester platform of conventional windrowers are susceptible of a variety of problems primarily concerning the "flow" of the crop from the initial cutting step to the final disposition of the crop in a windrow. Conventional windrows often include auger type conveyors mounted over the harvester platform and in which the crop is conveyed longitudinally of the auger between the platform and the auger. In this arrangement the crop may wedge between the platform and the lower portion of the auger with the result that the flow of the crop is intermittent or completely stopped. Moreover, since the crop is confined between the platform and the auger, it is subject to considerable beating or threshing action which is particularly undesirable in the case of seed crops.

Conventional auger type conveyors are also susceptible to the problem of the crop wrapping around the auger so that the crop is not moved longitudinally thereof as desired.

Additional problems have been encountered regarding the flow or feeding of the crop from the auger to the crushing rollers of the harvester. In some instances the crop may wrap around the end portions of the rollers. Additionally the crop may bunch or accumulate unevenly along the auger so that the crop is fed between the rollers in a mat of uneven thickness. The effectiveness of the crushing operation is accordingly reduced.

SUMMARY

The invention relates to an improved harvester platform for a windrower which includes a crop discharge opening defined through the platform. Conveying means are mounted on the platform for supporting and moving the cut crop lengthwise of the platform toward the crop discharge opening. The harvester platform includes crop conditioning means in the form of a pair of cooperative crushing rollers mounted in vertically overlapping relation to the conveying means in close proximity thereto to facilitate removal or transfer of the crop from the conveying means to the discharge opening for smooth flow between the crushing rollers.

The conveying means is designed to support and move the crop on the upper portion thereof to eliminate the problem of the crop wedging between the platform and the auger of conventional windrowers. The unique placement of the crushing rollers with respect to the conveying means enables one of the rollers to strip the crop from the conveying means for delivery of the crop between the rollers for crushing. Consequently the crop is prevented from wrapping around the conveying means and is delivered smoothly between the rollers.

The conveying means is preferably in the form of an auger having flights of varying pitch which conveys the crop in such manner that the crop flows through the discharge opening and between the rollers in a mat or mass of uniform thickness. Consequently the crop is prevented from bunching and wrapping around the end portions of the rollers and the crushing action is more uniform due to the even thickness of the crop.

BRIEF DESCRIPTION OF THE DRAWINGS

FIG. 1 is a perspective view of a self-propelled windrower incorporating the harvester platform of the invention;

FIG. 2 is a fragmentary sectional view of the harvester platform taken in the direction of arrows 2—2 of FIG. 1; and FIG. 3 is a fragmentary plan view of the harvester platform of the invention.

DESCRIPTION OF THE PREFERRED EMBODIMENT

Referring first to FIG. 1, there is shown a self-propelled windrower 10 which includes a harvester platform assembly 11 coupled to the forward end thereof through suitable connecting and lifting means. The platform 11 includes a rear frame member 12 extending lengthwise of the platform and a pair of upright sidewalls 13 and 14 extending forwardly from opposite ends of the frame member 12 as shown. Other major components of the platform assembly 11, shown generally in FIG. 1, include a reel 15 mounted between the sidewalls 13 and 14; a sickle-type cutter assembly 16 mounted across the bottom of the platform 11; and an auger 17 mounted across the platform rearwardly of the cutter 16. The platform 11 further includes a wall 18 extending between the side walls 13 and 14 and through which a crop discharge opening 19 is defined rearwardly and above the auger 17. A pair of crop conditioning rollers 20 and 21 are mounted rearwardly of the crop discharge opening 19. The unique cooperative relationship of the above mentioned components as well as a more detailed description of the details thereof, will become apparent as the description proceeds.

With reference now to FIGS. 2 and 3, the reel 15 may be of known kind and includes a plurality of circumferentially spaced longitudinally extending bars 22, each having a plurality of tines 23 thereon. The reel 15 may be of the cam-operated type functioning so that the tines 23 extend in predetermined directions so that the ends thereof define a path indicated by a dotted line 24 as the reel rotates. As best shown in FIG. 2, the reel 15 is positioned above and somewhat forwardly of the cutter 16 so that the tines 23 move rearwardly over the cutter 16 and then upwardly and rearwardly in close proximity to the auger 17.

The auger 17 is rotatably mounted rearwardly of the cutter 16 above a semi-cylindrical bottom portion 25 of the platform wall 18. As shown in FIGS. 1 and 3, the auger 17 includes a pair of helical conveying flights 26 and 27 extending inwardly from opposite ends respectively of the auger and terminating in inner ends 28 and 29 respectively proximate to the center of the crop discharge opening 19. In the preferred embodiment shown the flights extend inwardly somewhat beyond the center of the platform and the crop discharge opening so that the flight ends 28 and 29 axially overlap.

Each of the flights 26 and 27 is of a first uniform pitch from the respective end of the auger inwardly past the respective edge of the crop discharge area and the ends of the rollers 20 and 21. The axial extent of the first portion of uniform pitch is indicated by the distance E in FIG. 3 illustrating the axial overlap with respect to the adjacent ends of the rollers. The flights 26 and 27 have a second uniform pitch substantially greater than the above mentioned first pitch extending the axial distance F as shown.

As shown generally in FIG. 1, the crushing rollers 20 and 21 are disposed rearwardly of the discharge opening 19 which is longitudinally defined by generally vertically disposed edges 30 and 31. The rollers are preferably slightly longer than the longitudinal distance between the edges 30 and 31.

Referring again to FIGS. 2 and 3, the rollers 20 and 21 are rotatably mounted between a pair of mounting plates 32 and 33 extending rearwardly from the platform wall 18. The lowermost roller 20 is journaled in the plates 32 and 33. The uppermost roller 21 has a longitudinal shaft 34 extending through the plates 32 and 33 and journaled in arms 35 and 36. The arms 35 and 36 are pivotally coupled to the outside of the plates 32 and 33, respectively by pins 37 and 38, respectively. Suitable spring means (not shown may be utilized to bias the roller 21 downwardly against the roller 20 to provide a crushing action therebetween. The rollers 20 and 21 are adapted to be rotatably driven through suitable means innerconnected with the power source of the windrower.

In accordance with an important feature of the invention, and as best shown in FIG. 2, both rollers 20 and 21 are disposed in vertically overlapping relation with respect to the auger 17, with the lowermost roller 20 being in close proximity to the periphery of the auger. As shown by the arrows B and C, the auger 17 and roller 20 are rotatable in the same direction so as to move in opposite directions at their closest proximity. Accordingly the roller 20 serves as a means for stripping the cut crop from the upper portion of the auger 17 to augment delivery of the crop rearwardly between the rollers.

As shown generally in FIG. 1, the platform structure includes a pair of crop stripper members 39 and 40 secured on the wall 18. The stripper members 39 and 40 are mounted above the auger 17 and extend longitudinally thereof from the opposite ends respectively of the platform to the edges 30 and 31 of the crop discharge opening 19. As best shown in FIG. 2, each of the stripper members, as illustrated by the member 40, is disposed in close proximity to the upper crop carrying portions of the auger to prevent the crop from wrapping on the auger or wedging between the auger and the trough portion 25 of the platfrom.

The platform may include crop guide means disposed above the auger for assisting in guiding the cut crop toward the crop discharge opening. As shown in FIG. 1, guide members 41 and 42 are mounted on the platform wall 18 above the crop stripper members 39 and 40, respectively. Each of the guide members 41 and 42 includes a downwardly facing surface 43 overlying the auger 17 and inclined from the end of the platform upwardly toward the adjacent edge of the crop discharge opening. As shown in FIG. 3 the guide members 41 and 42 each extend beyond the adjacent opposite ends of the crushing rollers 20 and 21 and have a longitudinal extent substantially the same as that of the first portion of uniform pitch indicated by the distance E.

OPERATION

As the windrower is moved forwardly, the reel 15 is rotatably driven in the direction of arrow A so that the tines 23 move rearwardly over the cutter 16. The cut crop is engaged by the tines and is moved rearwardly toward the auger 17 which is rotatably driven in the direction of arrow B. The crop is then lifted between the tines and the auger for deposit on the upper portion of the auger.

It will be apparent with reference to FIG. 3 that the crop deposited on the auger forwardly of the crop discharge area and crushing rollers will be moved more rapidly by the auger than the crop deposited on the outer portions of the auger. This is due to the increased pitch of the flights across the discharge area and rollers. Consequently as the crop accumulates on the auger forwardly of the crop discharge area, bunching and uneven crowding of the crop is reduced so that the crop will be fed rearwardly through the discharge opening more uniformly and in a continuous mat of even thickness. Moreover, the overlap of the flight portions of the smaller pitch past the ends of the opening and rollers, insures that the crop will not bunch and wrap around the ends of the rollers.

The crop stripper members 39 and 40 assist in preventing the crop from wrapping around the outer portions of the auger. In the area across the discharge opening, the stripping function is performed by the lower roller 20 which is rotatably driven in the direction of arrow C in the same direction of rotation as the auger. Moreover, the close proximity and rotational direction of the roller 20 with respect to the auger insures that the crop will be quickly and smoothly transferred from the auger for rearward movement between the rollers 20 and 21. The roller 21 is rotatably driven in the direction of arrow D and thus oppositely to roller 20 so that the crop is moved rearwardly therebetween for crushing and subsequent deposit on the ground in a windrow.

It will be realized that in its broad aspects the invention includes the concept of positioning the rollers in close proximity or close coupled relation to the auger to provide the unique crop-stripping action. Accordingly, the illustrated and described vertically overlapping relationship of the rollers and auger is merely that of a preferred embodiment.

In the illustrated embodiment of the invention the crop guide members 41 and 42 may be included in the platform structure for guiding the flow of the crop toward the discharge opening. The crop guiding surface 43 diverges from the upper crop-carrying portion of the auger 17 in a direction toward the crop discharge opening 19 for accommodating the increasing volume of the crop accumulating on the auger. Consequently the inclined surface 43 constrains the crop for movement on the auger in a progressively increasing mass or thickness as the crop is conveyed inwardly from the end of the platform.

In addition to the above described function, the crop guide members 41 and 42 are disposed in close proximity to the rearmost portion of the reel 15 so that any crop carried upwardly by the tines 23 proximate to the members 41 and 42 will be stripped from the tines by the members 41 and 42.

From the foregoing it will be appreciated that the harvester platform structure of the invention permits the crop to flow smoothly through the device by eliminating the problems of bunching and wrapping often encountered in prior machines. Moreover, the crop is delivered for crushing between the rollers in a mat or mass of uniform thickness providing an efficient crushing operation.

Various changes falling within the scope of the inven-

What is claimed is:

1. A crop harvester having a laterally elongated platform with a crop discharge opening defined therethrough, comprising: an auger mounted lengthwise of said platform and spanning said discharge opening, said auger having a pair of helical flights extending inwardly from its ends respectively and terminating in inner ends adjacent to the center of said discharge opening, each of said flights being of uniform pitch from the auger end inwardly proximate to the edge of said discharge opening and of a pitch greater than said uniform pitch across said discharge opening to said inner end; a first crushing roller mounted on said platform in closely spaced vertically overlapping relation to said auger generally rearwardly of said discharge opening, said first roller rotatable in the same direction as said auger for stripping the crop therefrom; and a second crushing roller mounted on said platform in close proximity to said first roller and rotatable oppositely thereto for crushing the crop therebetween and augmenting the removal of the crop from said auger.

2. The subject matter of claim 1, in which the opposite ends of said rollers are disposed proximate to the opposite edges of said discharge opening respectively, the uniform pitch of said flights extending inwardly past the ends of said rollers thereby reducing bunching of the crop at the roller ends.

3. The subject matter of claim 1, including a cutter mounted along the forward edge of said platform forwardly of said auger; and a reel mounted across said platform generally forwardly and above said cutter, said reel rotating in the direction opposite that of said auger and including peripheral elements moving close to said cutter and engaging the crop being cut and thereafter moving in a path closely adjacent the periphery of said auger, whereby the cut crop is engaged and lifted between said peripheral elements and said auger for deposit on the upper portion of said auger.

4. In a conveying device for a crop harvester including an elongated platform having a crop discharge area, a conveyor for moving the crop longitudinally of said platform toward said discharge area and concurrently accumulating an increasing volume of crop in a direction toward said discharge area, means including a reel for depositing the crop onto said conveyor, and a downwardly facing crop guiding surface positioned in diverging relation to said conveyor in a direction toward said discharge area for accommodating the increasing volume of crop accumulated on said conveyor and cooperative with said reel for stripping crop therefrom.

5. The subject matter of claim 4, in which said crop guiding surface is mounted in vertically spaced relation above said conveyor and is elongated longitudinally of said conveyor.

6. A crop harvester having a laterally elongated platform with a crop discharge opening defined therethrough, comprising:
   conveying means for moving the crop lengthwise over said platform toward said crop discharge opening; and
   crop conditioning means mounted across said discharge opening for receiving the crop through said opening from said conveying means, said conditioning means including a pair of cooperative rotatable crushing rollers mounted in close-coupled relation to said conveying means to facilitate removal of the crop from said conveying means through said discharge opening for movement between said rollers, said crushing rollers being mounted in vertically overlapping relation to said conveying means.

7. A crop harvester having a laterally elongated platform with a crop discharge opening defined therethrough, comprising:
   conveying means for moving the crop lengthwise over said platform toward said crop discharge opening; and
   crop conditioning means mounted across said discharge opening for receiving the crop through said opening from said conveying means, said conditioning means including a pair of cooperative rotatable crushing rollers mounted in close-coupled relation to said conveying means to facilitate removal of the crop from said conveying means through said discharge opening for movement between said rollers, said platform including crop guide means disposed above said conveying means in vertically spaced relation thereto and including a downwardly facing elongated surface inclined upwardly toward said crop discharge opening for guiding the crop in progressively increasing thickness lengthwise of said platform toward said discharge opening and crop conditioning means.

8. A crop harvester having a laterally elongated platform with a crop discharge opening defined therethrough, comprising:
   conveying means including an auger extending across said crop discharge opening for moving the crop lengthwise of the platform toward said crop discharge opening, said auger including helical flighting extending therealong toward said discharge opening, said auger being rotated in such direction that its upper portion moves rearwardly and said flighting works toward said discharge opening so that the crop is supported upon said auger for movement toward said discharge opening for subsequent rearward movement therethrough over said auger; and
   crop conditioning means disposed across said discharge opening for receiving the crop through said opening from said auger, said conditioning means including a pair of driven cooperative rotatable crushing rollers mounted on said platform one above the other for crushing the crop therebetween, the peripheries of said rollers being in closest proximity to each other at a level proximate to the level of the upper portion of said auger, the lower of said rollers being in close proximity to and rotatable in the same direction as said auger for stripping the crop from said upper portion to augment delivery of the crop between said rollers.

9. The subject matter of claim 8, wherein the peripheries of said rollers are in closest proximity to each other at a level above the level of the upper portion of said auger.

References Cited

UNITED STATES PATENTS

| | | | |
|---|---|---|---|
| 3,060,665 | 10/1962 | Escher | 56—21 |
| 3,224,177 | 12/1965 | Adee | 56—23 |
| 3,324,639 | 6/1967 | Halls et al. | 56—1 |
| 3,412,535 | 11/1968 | Drummond | 56—23 |

ANTONIO F. GUIDA, Primary Examiner

U.S. Cl. X.R.

56—1; 198—217